Patented July 21, 1942

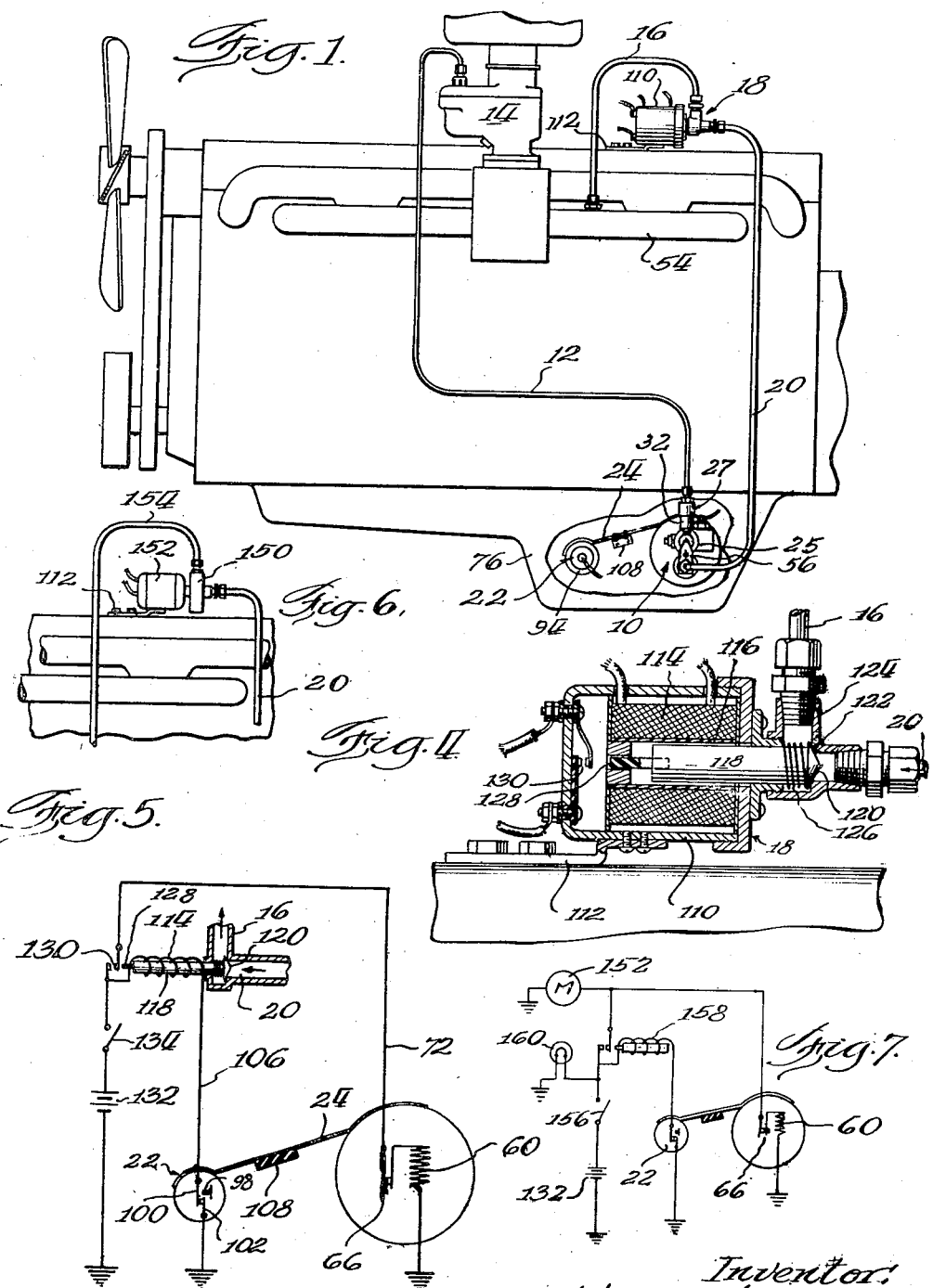

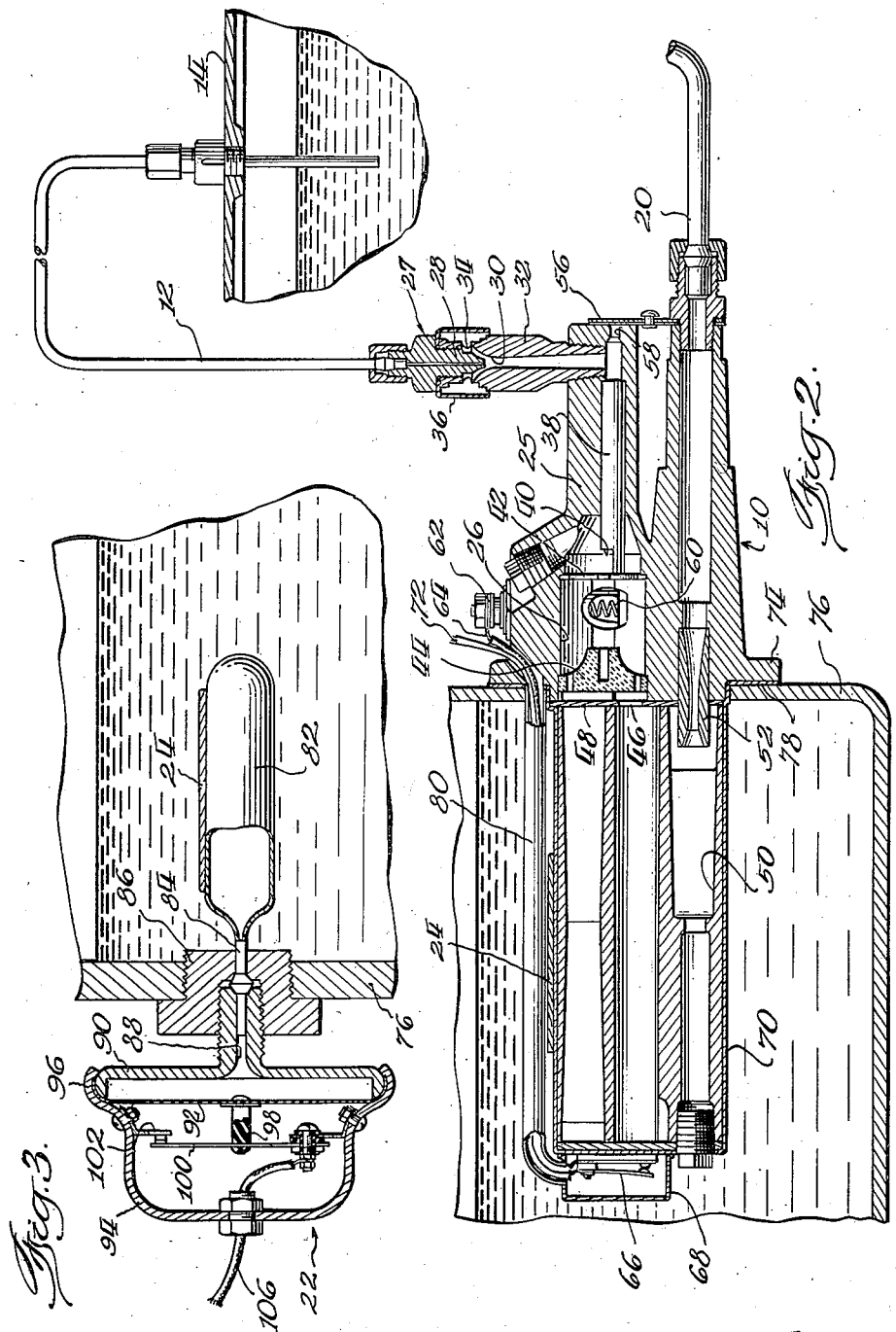

2,290,300

UNITED STATES PATENT OFFICE 2,290,300

AUTOMOBILE HEATER

Thomas F. Spackman, Chicago, Ill., assignor to Stewart-Warner Corporation, Chicago, Ill., a corporation of Virginia Application January 8, 1940, Serial No. 312,878

13 Claims. (Cl. 123—196)

My invention relates generally to devices for maintaining the oil in the crank case of an automobile engine at an optimum operating temperature. More particularly, my invention comprises the utilization of an internal combustion type heater with suitable novel control as a means for maintaining the oil in an automobile engine crank case at a suitable temperature, and thereby preventing the oil from becoming excessively diluted with gasoline.

In automobile trucks and the like used for delivery purposes or other purposes where the engine is frequently started and stopped, considerable dilution by gasoline of the oil in the engine crank case results during cold weather because of the excessive gasoline supplied to the engine cylinders while choking the engine carburetor to facilitate starting. When the use of the automobile is such that it must frequently be started and stopped during cold weather, this dilution of the oil by the gasoline may become so great that the oil loses its lubricating properties to a considerable extent, and as a result, the bearing parts of the motor may become damaged.

It is thus an object of my invention to provide means for preventing such excessive dilution of the engine lubricating oil.

A further object is to provide an improved heating device for maintaining the engine lubricating oil of an internal combustion engine at an optimum operating temperature.

A further object is to provide improved controls for an internal combustion type heater whereby it may be efficiently used as a means for maintaining a liquid at a desired temperature.

Other objects will appear from the following description, reference being had to the accompanying drawings, in which:

Figure 1 is a somewhat diagrammatic side elevational view of an automobile engine showing the manner in which the crank case oil heating apparatus of my invention may be mounted thereon;

Figure 2 is a central vertical cross-sectional view of the heater as mounted with its heat exchanger submerged in the crank case oil;

Figure 3 is a fragmentary sectional view showing the thermostatic control switch for the heater;

Figure 4 is a vertical sectional view of the electromagnetically operated control valve for the heater;

Figure 5 is a wiring diagram showing the electrical connections for the heater;

Figure 6 is a view illustrating a modification in which the heater is operated by a suction pump; and Figure 7 is a wiring diagram, the embodiment of Figure 6.

Referring to Fig. 1, the heater 10 is shown as mounted upon the side wall of the oil pan adjacent the lowest part thereof so that it lies beneath the normal oil level in the oil pan. The heater is supplied with fuel through a conduit 12 which is connected to the float bowl of the engine carburetor 14. A conduit 16 is connected to an electromagnetically operated valve structure 18 which controls the flow of gases of combustion from the heater through a conduit 20. A thermostatically operated control switch assembly 22 is connected in heat conducting relationship to the heater 10 by a copper or other metal strip 24.

Referring to Fig. 2, the heater comprises a body casting 25 having a combustion chamber 26 formed therein. The gasoline supplied through the conduit 12 is mixed with air in a carbureting device 27 which may be of any suitable construction, being illustrated as having a nozzle 28 terminating adjacent the throat of a Venturi-like passageway 30 formed in a fitting 32, atmospheric air being admitted to the passageway 30 through ports 34 formed in the fitting 32. A guard 36 protects the ports 34 against the admission of large foreign particles. The mixture of gasoline and air which is formed in the passageway 30 flows through a tube 38 secured in the casting 25, and is pre-heated therein, and is ejected through an opening 40 formed at the inner end of the tube 38 against a baffle plate 42 which partially closes the inlet end of the combustion chamber 26. The outlet of the combustion chamber is restricted by a reigniter plug 44 made of a suitable refractory ceramic material having a plurality of ports formed therein. This reigniter becomes heated substantially to incandescence in the normal operation of the heater so that it is effective to reignite the mixture should the flame become extinguished accidentally due to an interruption in the application of suction to the heater.

The gases of combustion flowing through the ports in the reigniter 44 pass through an opening 46 formed in a closure plate 48 covering the end of a radiator casting 50. The casting 50 is provided with a long circuitous passageway, cored in the casting, the passageway commencing at the opening 46 and terminating adjacent a compensator 52 having a Venturi-shaped passageway therein. After thus flowing through the circuitous passageway in the radiator casting 50, the gases of combustion flowing through the compensator 52 are drawn through a conduit 16 which is connected to the intake manifold 54. The admission of additional air to the mixture flowing through the tube 36 is controlled by a bimetal thermostatic valve 56 which controls the opening of a port 58 to atmospheric air so that when the heater has been in operation for some time, the casting 25 will be raised to a sufficient temperature that combustion may be maintained in the chamber 26 by the use of a less rich mixture, and the efficiency of combustion thereby increased. The mixture in the combustion chamber 26 is ignited by a resistance wire igniter 60, one end of which is connected to ground, represented by the casting 25, and the other end of which is connected to a terminal 62. A conductor 64 leads from the terminal 62 to one arm of a thermostatic switch 66 which may be mounted in any position on the heater where the switch will be exposed to variations in heater temperature for operation thereby. In the embodiment shown, this thermostatic switch 66 is enclosed in a suitable casing 68 attached to the inner end of a sleeve 70 surrounding the casting 50. The other side of the switch 66 is connected to a conductor 72. The casting 25 has a flange 74 by which it is secured to the side wall of the oil pan or crank case 76 of the automobile engine; a flange 78 formed at the end of the copper sleeve 70 functioning as a gasket to seal the connection against escape of oil from the oil pan. Conductors 64 and 72 are preferably housed in a conduit 80 protecting the conductors against damage by the contents of the oil pan. The operation of the heater is controlled in part by a thermostatically operated switch responsive to the temperature of the oil in the oil pan, comprising a bulb 82 immersed in the oil and containing ether or a similar substance or mixture of substances which has a low boiling point. The bulb 82 has a neck 84 which is supported in a bushing 86, and communicates with a passageway 88 formed in a diaphragm housing 90, the neck of which is threaded in the bushing 86. A diaphragm 92, preferably of a highly flexible sheet metal, is secured at its peripheral edge to the flanged end of the housing 90 by a cap 94, the peripheral edge 96 of which is spun over the edge of the diaphragm, thereby clamping the diaphragm between the edge portion 96 and the flange of the housing 90. The diaphragm is illustrated as having an insulating actuator 98 secured to the central portion thereof for operation of a switch arm 100 having a contact cooperable with a fixed contact 102 which is secured in electrical conducting relationship to the cap 94. The switch arm 100 is of course insulated from the cap 94 and is in electrical connection with a conductor 106. For the sake of simplicity, this thermostatically operated switch is illustrated and described herein as being a simple contact switch. In actual practice, however, it will preferably be a snap switch of the "microswitch" type.

The bulb 82 is connected in heat conducting relationship with the sleeve 70 of the radiator by the strip 24 of heat conducting metal, the strip being supported by a suitable heat insulating bracket 108 which is secured to the side wall of the oil pan. It will be noted that the ends of the metal strip 24 are conformed to fit over the sleeve 70 and the bulb 82 to provide a larger area of contact, assuring a high rate of heat conduction between the sleeve 70 and the bulb.

The electromagnetically operated switch, best shown in Fig. 4, comprises a casing 110 which is secured in a suitable position on the engine block by means of a bracket 112. A solenoid coil 114 is suitably positioned within the casing 110 having a non-magnetic hollow cylindrical liner 116 for a magnetic plunger 118. One end of the plunger 118 has a valve 120 formed thereon for cooperation with a valve seat 122 formed in an elbow fitting 124. The solenoid plunger 118 is normally held in a position in which its valve 120 is in engagement with its seat 122 by a compression coil spring 126.

The opposite end of the solenoid plunger 118 has an insulating pin 128 secured thereto for the actuation of a switch 130. It will be noted that when the winding of the solenoid is energized, the valve 120 will be open to permit flow of gases of combustion from the heater through the conduit 20, elbow fitting 124, and conduit 16 into the intake manifold 54.

One of the poles of the switch 130 is connected to a battery 132, which may be the usual storage battery of the automobile, through a switch 134, which may be the engine ignition switch, or a switch operated coincidentally therewith. Said terminal of the switch 130 is also connected to one end of the winding 114, the other end of which is connected by a conductor 106 to the thermostatically operated switch arm 100, and when the switch formed thereby is closed, the conductor 106 is connected to ground, thus completing the circuit for energizing the solenoid 114. The other pole of switch 130 is connected by a conductor 72 to the thermostatic switch 66 which is in series with the igniter wire 60.

Assuming that the switch 134 is closed and the automobile engine started, the heater will operate in the following manner. If the temperature of the oil in the oil pan is sufficiently low that gasoline diluted therewith will not readily evaporate, the thermostat 82 will permit the switch 100, 102 to close, thereby completing the circuit through the coil 114 of the solenoid actuated valve 120, opening the latter and closing switch 130. Opening the valve 120 will permit the suction of the intake manifold to draw a mixture of gasoline and air into the heater, and closure of the switch 130 will result in supplying current to the igniter 60, rapidly raising the latter to incandescent temperature and igniting the mixture of fuel and air blowing through the combustion chamber 26.

The heater will thus commence operation, the flame being maintained in the combustion chamber through minor interruptions in the intake manifold vacuum by the reigniter 44, which is rapidly raised to incandescent temperature. The heater will continue in operation until either the oil in the oil pan is heated to a predetermined high temperature to cause adequate evaporation of the gasoline diluting the oil, or through some unusual accidental condition, the radiator casting 50 becomes excessively hot. In the former case, the thermostat 82 will operate to open the switch 100, 102, thereby interrupting the energizing circuit through the coil 114 of the solenoid and permitting the valve 120 to close against its seat 122 and the switch 130 to open. Upon closure of the valve 120, the operation of the heater will be immediately stopped, since its operation is dependent upon the flow of the products of combustion to the intake manifold of the engine through the valve fitting 124.

Under the other condition under which the heater operation may be stopped, the thermostat 82 may be heated to a temperature at which it will open the switch 100, 102, due to the conduction of heat from the shell 70 of the radiator or heat exchange device to the bulb 82 of the thermostat, through the heat conducting strip 24. Thus, for example, should the level of oil in the oil pan drop below the shell 70 of the radiator or heat exchange device, and thus fail to be appreciably heated by the heater, the heater would continue in operation and might become excessively hot were it not for the fact that under these conditions, heat is transmitted directly from the heat exchanger shell 70 to the thermostat bulb 82 by the copper or other metal strip 24. The possibility that under such conditions the heat exchange device might become excessively hot is thus obviated.

It will be understood that under normal conditions of operation, the shell 70, bulb 82 and copper strip 24 will be immersed in oil so that due to the cooling effect of the oil, the strip 24 will not be effective to conduct heat from the shell 70 to the bulb 82 at a sufficiently rapid rate to cause the thermostat to open the switch 100, 102, but when the strip 24 is no longer immersed in oil, its heat losses are lower, and it is effective to conduct heat rapidly from the shell 70 to the bulb 82 of the thermostat.

When the heating system as described above is installed upon a truck or automobile which is frequently started during cold weather, and the oil thus unavoidably and excessively diluted with gasoline, the heater commences operation whenever the engine is started, and continues operation while the engine is running so as rapidly to heat the oil in the oil pan and evaporate the excessive gasoline thereupon. Whenever the temperature of the oil is above that necessary to produce reasonably complete evaporation of gasoline from the oil, the heater is maintained inoperative due to the fact that the thermostat switch 100, 102 is maintained open.

Since the heater carbureting device is located some distance below the level of the float bowl of the engine carburetor from which the fuel is drawn, there will be flow of the gasoline remaining in the conduit 12 to the heater whenever the heater is turned off. The diameter of the tube 12 is, however, made so small that there will not be an appreciable volume of gasoline which will seep therefrom under these conditions. However, if operating conditions make it undesirable that there be this seepage of gasoline to the carbureting device of the heater, an auxiliary fuel reservoir located at the level of the carbureting device or slightly below, may be utilized as the source of fuel for the heater.

It is not essential that the heater be operated from the suction in the intake manifold of the engine, as any other suitable source of suction may be utilized. In Figure 6 I have illustrated a modification in which the heater discharge conduit 20 is connected to a suction pump 150 driven by an electric motor 152 mounted on the bracket 112 attached to the head of the automobile engine. The pump 150 discharges through a pipe 154 which preferably extends beneath the body of the automobile so that the gases discharged from the heater will not find their way into either the engine compartment or passenger compartment of the vehicle.

It will be understood that the motor 152 may, if desired, be located in a circuit in series with the ignition switch 134 and thermostatically operated switch 22. In such an arrangement, however, it would not be feasible to operate the heater except when the automobile engine is operating, since it is undesirable to have the ignition switch in the "on" position except when the engine is operating.

One of the advantages of having the heater connected to the suction pump 150 is to operate the heater for several minutes before starting the automobile engine in order to warm up the oil in the crank case prior to operation of the automobile engine. In Figure 7 I have indicated a circuit arrangement which makes this mode of operation eminently satisfactory. In this figure I have shown a circuit comprising the automobile battery 132, a manually operated switch 156 which, it will be understood, is separate from the ignition switch, the thermostatically controlled switch 22, and a relay 158. The relay 158 controls the circuit containing the motor 152 and also the circuit containing the igniter 60 and thermostatic switch 66.

Since the circuits of Figure 7 are independent of the ignition switch, it is desirable that some means be provided for warning the operator of the vehicle that the switch 156 is in closed position in order that he will not leave the vehicle for any length of time with these circuits in operating condition. I have accordingly illustrated a light 160 as being so connected that the light remains lit as long as the switch 156 is closed. It will be understood that this light is intended to be located on the instrument board of the vehicle or in some other suitable place where it will serve as a constant notification that the switch 156 is closed. This light may be white or green or any other color best suited to serve the desired purpose.

With the arrangement of Figure 7 it will be noted that the motor 152 only operates when the manual switch 156 is closed and when the thermostatic switch 22 calls for heat. These conditions may obtain both prior to and during engine operation.

While I have shown and described only particular embodiments of my invention, it will be apparent to those skilled in the art that numerous variations and alterations may be made in the form of the invention without departing from the underlying principles thereof. I therefore desire, by the following claims to include within the scope of my invention all such similar and equivalent constructions and methods whereby substantially the results of my invention may be obtained by substantially the same or equivalent means.

I claim:

1. In a system for preventing excessive gasoline dilution of the lubricating oil of an internal combustion engine having a reservoir therefor, the combination of an internal combustion heater having a heat exchange device in heat exchange relationship with the oil in said reservoir, means operated incidental to conditioning the internal combustion engine for operation to condition said heater for operation, a thermostat normally in contact with and responsive to the temperature of the oil in said reservoir to render said heater inoperative when the oil has attained a predetermined temperature, and means to cause said thermostat to render said heater inoperative whenever said thermostat is no longer in contact with the oil and said heat exchange device has become excessively hot.

2. In an oil heating system for the lubricating oil of an internal combustion which has an ignition switch and an oil reservoir, the combination of a heater having a heat exchanger in heat conducting relationship with the oil in said reservoir, a valve for controlling the operation of said heater, a solenoid for actuating said valve, a thermostat switch responsive to the temperature of the oil in said reservoir, a source of electrical energy, and a circuit completed coincidentally with the closure of said ignition switch, said circuit connecting said source, said solenoid, and said thermostatic switch in series.

3. In an oil heating system for the lubricating oil of an internal combustion engine which has an oil containing reservoir, the combination of an internal combustion type heater having a heat exchanger in heat conducting relationship with the oil in said reservoir, a thermostat responsive to the temperature of the oil in said reservoir, a valve for controlling the operation of said heater, electrical means controlled by said thermostat for actuating said valve and causing said heater to operate when the temperature of the oil in said reservoir drops below a predetermined minimum value, and means controlled by said thermostat for rendering said heater inoperative when the heater becomes excessively hot due to insufficient contact with the oil in said reservoir.

4. In an oil heating system for the lubricating oil of an internal combustion engine which has an oil containing reservoir, the combination of an internal combustion type heater having a heat exchanger in heat conducting relationship with the oil in said reservoir, a thermostat responsive to the temperature of the oil in said reservoir, electrical means including a solenoid actuated valve and switch controlled by said thermostat to render said heater operative when the oil in said reservoir drops below a predetermined minimum temperature, and means cooperating with said thermostat to render said heater inoperative when the heat exchanger becomes excessively hot.

5. In an oil heating system for the lubricating oil of an internal combustion engine, in which the internal combustion engine is provided with a fuel supply system, a lubricating oil reservoir, and an intake manifold, the combination of a heater having a combustion chamber, an electrical igniter associated with said combustion chamber, means to supply a combustible mixture of fuel and air to said combustion chamber, said means being supplied with fuel from said engine fuel supply system, a heat exchanger device having a passageway receiving products of combustion from said combustion chamber, a conduit connecting said passageway to the intake manifold of said engine, an electromagnetically actuated valve in said conduit, a thermostat responsive to the temperature of the oil in said reservoir, a circuit closed by said thermostat when the temperature of the oil in said reservoir is below a predetermined minimum value, said circuit including the winding of the electromagnetically actuated valve, a switch operated coincidentally with said valve to energize said igniter, and a thermostat responsive to the temperature of said heat exchange device to open the circuit to said igniter.

6. In an oil heating system for the lubricating oil of an internal combustion engine having a lubricating oil reservoir, the combination of a heater having a combustion chamber, an electrical igniter associated with said combustion chamber, means to supply a combustible mixture of fuel and air to said combustion chamber, a heat exchange device having a passageway receiving products of combustion from said combustion chamber, a conduit connecting said passageway to a space at sub-atmospheric pressure, a valve in said conduit, a solenoid for actuating said valve, a thermostat responsive to the temperature of the oil in said reservoir, a circuit closed by said thermostat when the temperature of the oil in said reservoir is below a predetermined minimum value, said circuit including a source of electrical energy and the winding of said solenoid, a switch operated by said solenoid coincidentally with the opening of said valve to connect said igniter to a source of electrical energy, and a thermostat responsive to the temperature of said heat exchange device to disconnect said igniter from the source of energy.

7. In a system for the heating of the lubricating oil in the oil reservoir of an internal combustion engine, the combination of an internal combustion type heater having a heat exchanger for heating the lubricating oil, a thermostat heated by said oil, said thermostat being operable to control the operation of said heater, and a member of high heat conductivity normally immersed in oil in said reservoir and connecting said heat exchanger to said thermostat, said member being operable to conduct heat from said heat exchanger to said thermostat at an increased rate when the level of the oil in said reservoir drops below said heat exchanger and said thermostat.

8. In a system for the heating of the lubricating oil of an internal combustion engine, the combination of an internal combustion type heater having a heat exchange device immersed in the lubricating oil, a thermostat immersed in said oil at a spaced distance from said heat exchange device, said thermostat being operable to control the operation of said heater, and a member of high heat conductivity connecting said heat exchanger to said thermostat and operable to conduct heat from said heat exchanger to said thermostat at a rapid rate when the level of the oil in said reservoir drops below said heat exchanger.

9. In a system for the heating of the lubricating oil of an internal combustion engine, the combination of an internal combustion type heater having a heat exchange device for transferring heat to the lubricating oil, a thermostat responsive to the temperature of said oil, said thermostat being operable to control the operation of said heater, and a member of high heat conductivity normally immersed in said oil and connecting said heat exchanger to said thermostat and operable to conduct heat from said heat exchanger to said thermostat at a rapid rate when the level of the oil in said reservoir is insufficiently high to cover said member.

10. In a system for preventing excessive gasoline dilution of the lubricating oil of an internal combustion engine having a reservoir for the lubricating oil and an ignition switch, the combination of an internal combustion heater having an electrical igniter and a heat exchange device in heat conducting relationship with the oil in said reservoir, a switch closed incidental to the closing of the ignition switch, a solenoid having a winding, a solenoid switch arranged to be closed upon energization of said winding, a source of electrical energy, a thermostatically operated switch closed whenever the temperature of the oil in said reservoir is below a predetermined minimum value, said thermostatic switch being in series with said source, said first named switch, and the winding of said electromagnet; a second thermostatically operated switch responsive to the temperature of said heat exchange device to open when the latter attains an operating temperature, and a circuit connecting said source, said first-named switch, said solenoid switch, said second thermostatic switch, and said igniter in series.

11. In a system for preventing excessive gasoline dilution of the lubricating oil of an internal combustion engine having a reservoir for lubricating oil and having an ignition switch, the combination of an internal combustion heater having a heat exchange device in heat exchange relationship with the oil in said reservoir, means including a solenoid actuated switch operated independently of the operation of said ignition switch to condition said heater for operation, and a thermostat responsive to the temperature of the oil in said reservoir to render said heater inoperative when the oil has attained a predetermined temperature.

12. In a system for preventing excessive gasoline dilution of the lubricating oil of an internal combustion engine having a reservoir for lubricating oil, the combination of an internal combustion heater having a heat exchange device in heat exchange relationship with the oil in said reservoir, means including a solenoid actuated switch operated independent of the operation of said internal combustion engine to condition said heater for operation, and a thermostat responsive to the temperature of the oil in said reservoir to render said heater inoperative when the oil has attained a predetermined temperature.

13. Apparatus for heating the oil in the crank case of an internal combustion engine comprising the combination of a suction operated internal combustion heater having a heat exchange device in heat exchange relationship with the oil in said crank case, a suction pump for operating said heater independently of the operation of said internal combustion engine, thermostatic control means for said heater, and warning means independent of said thermostatic control means, said warning means indicating at all times the conditioning of said heater for operation subject to the control of said thermostatic control means.

THOMAS F. SPACKMAN.